Patented Sept. 14, 1937

2,093,260

UNITED STATES PATENT OFFICE 2,093,260

PROCESS OF TREATING CEREAL GRAINS, ETC.

Harold K. Wilder and Carl W. Lindow, Battle Creek, Mich., assignors to Kellogg Company, Battle Creek, Mich., a corporation of Delaware No Drawing. Application December 14, 1933, Serial No. 702,362

16 Claims. (Cl. 99—80)

This invention relates to improvements in the manufacture of foods made from cereal grains, legumes or other plant materials containing substantial quantities of fat or oil, and while it is particularly adapted to foods of the ready-to-eat, so-called, breakfast food type, it may be usefully employed in other varieties of foods where, in the process of manufacture, the material is subjected to a cooking heat and is finally dried, baked, roasted or toasted.

It has for its object the production of stable foods from raw materials which, when prepared by the processes common in the prior art, would yield products so subject to the development of stale or rancid odors and flavors as to prevent the successful merchandising of the finished products.

It is well-known, for example, that toasted corn flakes prepared from whole corn develop rancid flavors within a few days or weeks if enclosed in a package of the tightness necessary to prevent excessive moisture absorption by the said flakes. It has therefore been necessary to remove the oil-containing germ from the kernel before processing, thus depriving the food of valuable energy and vitamin-yielding constituents in order to permit manufacture of a product which would remain fresh long enough to permit proper sale in the ordinary channels of trade.

For the same reason, oats have not lent themselves to the making of ready-to-eat oat flakes of sufficient keeping quality.

In a similar fashion, ready-to-eat wheat products have suffered serious limitations as to modes of processing possible without the development of rancid odors and flavors.

By means of the present invention it has been possible to avoid the development of rancidity during the normal period required for national distribution of such foods. As an example, certain wheat cereals when flavored with salt in the manner common in the art become rancid within one or two months after manufacture, whereas similar cereals processed by our invention have been found to remain free from rancid odors even after more than six months' storage. This extension of the period of freshness permits the marketing of desirable foodstuffs not possible when manufactured by the methods formerly known in the art.

It is also possible by use of our invention to manufacture ready-to-eat foods from oil-containing cereals, legumes and other plant materials, thus retaining valuable food constituents which would by their presence spoil products made and flavored by the common methods of manufacture.

It is well-known that fats are the agents primarily responsible for developing rancidity in cereal foods. Salt and the like-acting substances, we have discovered, have under certain conditions the effect of accelerating the development of rancidity. We have further discovered as the result of our investigations and experiments the harmful influence of salt used in the manner heretofore common in the processing of cereal foods, that is, when cooked into the interior or body of the grain, in hastening the development of rancidity, and have further made the discovery that salt and the like, which are so essential in the flavoring or processing of cereal foods, may be so used as to eliminate the deleterious influence of salt when cooked with the cereal in the usual way.

In the processing of cereal foods as heretofore practiced, such for example as the manufacture of ready-to-eat flake cereal foods, the salt and sweetening agent, as sugar, in dilute aqueous solution, have been cooked with the cereal. The sugar as shown by our experiments is neutral so far as affecting the keeping qualities of the food. With the salt, however, it is a different matter. Salt and the like-acting substances cooked with cereals of a substantial fat content have a very deleterious influence on the food so far as development of rancidity is concerned.

According to the common practice of making ready-to-eat cereal foods, such as corn flakes, wheat flakes and other variously shaped types of such food, the process, broadly stated, consists in cooking the cereal in moisture, together with the flavoring material, usually consisting of salt and a sweetening agent, as sugar. The grains of cereal are thereafter rolled, or otherwise formed to the desired shape, and toasted in an oven.

Certain cereals so treated keep quite well, but others such as wheat, whole corn, oats and other grains of high fat content, become stale and rancid within a relatively short time and develop an unpleasant odor.

A long series of investigations and experiments led us to the discovery that those cereals which rapidly deteriorated and became rancid would, if the salt were omitted, keep in good condition for a far greater time. Using sweetening alone, that is without the salt, it was found that the keeping quality of the cereal was satisfactory. On the other hand, when salt was cooked with the cereal so as to intimately contact inner portions of the grains, whether or not the sugar was used, certain cereals, that is those of relatively high fat content, after a few weeks became rancid. It was discovered by us that the grains most seriously affected were those containing a substantial amount of fat, such as corn, oats and wheat from which the oil-containing germ was not substantially completely removed.

Further experiments and investigations led to the observation that certain chemical compounds, such as salt, have an undesirable influence on the fatty components of the cereal, their presence increasing the tendency of such cereals to develop rancidity. While the true cause of rancidity is still obscure, it would appear that commercial table salt (sodium chloride), such as is used in seasoning ready-to-eat cereal foods and the like, or some decomposition products produced from such ingredient, has the power of chemically splitting some components of the fat with the production of those substances which cause rancidity to develop.

Our observations led us to the conclusion that salt used in the common manner of making ready-to-eat cereal foods, for example, resulted in decomposition of the sodium chloride with the development of appreciable quantities of free hydrochloric acid. This acid is apparently formed by the decomposition of some of the sodium chloride in the presence of moisture and heat. Under the further influence of the heat in the cooking operation and in the toasting operation this small quantity of hydrochloric acid produced during the cooking and subsequent toasting operation probably acts upon the fatty substances present in the food, tending to promote acid hydrolysis of the fats with a consequent production of those decomposition products which accelerate the development of rancidity.

However, the use of salt or some similarly-acting substance is essential for flavoring in ready-to-eat cereal foods and the like. Without it the food has a flat, unappealing taste. Sold in competition with a salt flavored cereal food an unsalted ready-to-eat cereal food would find little, if any, market even though its keeping qualities were better.

As the result of investigations and experiments conducted by us, we have invented a process whereby the salt flavor may be obtained without jeopardizing the keeping qualities of food having a substantial fat content, by avoiding the addition of the salt to the food until after the completion of the high-temperature operations which result in decompostiion of the fat within the grains. We discovered that after such high-temperature operations as occur in the cooking of the grain and in the toasting of the same have been completed, the salt may be added in suitable fashion without affecting the keeping qualities of the food even though it be high in fat content.

In carrying out the invention in the manufacture of ready-to-eat cereal foods, for example, the cereal grain is cooked in the presence of moisture with or without a flavoring solution of sugar or equivalent flavoring substance and without extraneous salt or similarly-acting flavoring substance. The grains are thereafter formed to the desired shape by any suitable means, as by rolling them into flakes, and then the formed grains or kernels are run through a toasting oven. After the toasting operation the rolled and toasted grains or kernels are coated with a salt solution, and after drying are then ready for packing. In applying the salt we preferably employ a practically saturated aqueous solution. By this process the salt is applied in such manner that only the superficial surfaces of the flakes or other form of cereal product are impregnated with or have bonded to them the salt or like-acting flavoring substance. Thus the objections inherent in incorporating the flavoring salt with the grain before the grain is acted upon at a high temperature are avoided, while at the same time the product is provided with the essential flavoring salt, or the like.

The following examples are given to illustrate the procedure, although variations may be made therein both as to the grains and their form and the particular steps, except that it is essential that the addition of the salt or like-acting substances to the grains occur after the final toasting, baking, or roasting operation:

(1) Two hundred pounds of whole wheat are cooked with five gallons of water, preferably in a rotary steam cooker. The wheat is then rolled while hot and moist and then partially dried, that is to a moisture content of about eight per cent. The dried, rolled grains are then coated with seven gallons of a flavoring solution containing about sixteen pounds of sugar, but no salt. The grains are then further dried and then toasted in a suitable oven at a temperature of four hundred to six hundred degrees F, and allowed to cool. The toasted grains or kernels of wheat are then subjected to a fine spray composed of three pounds of salt dissolved in four and one-half quarts of water to deposit on the individual kernels a suitable quantity of salt, after which they are finally dried at a moderate temperature (about one hundred forty to two hundred degrees F.), after which they are ready for packing.

(2) Two hundred pounds of moist, crushed whole wheat are cooked in six gallons of water containing fifteen pounds of sugar, but no salt. The cooking is preferably done in a steam cooker and is continued until the wheat is thoroughly cooked. The cooked wheat is partially dried to a moisture content of about twenty-six per cent, or sufficiently to enable the wheat to be readily rolled. The grain is then properly tempered and is then rolled to form flakes, and toasted. The cool, toasted flakes are sprayed with a solution of four pounds of salt in six quarts of water, so as to impart the desired salty flavor, after which the flakes are dried at a moderate temperature.

In each of the above examples the customary procedure according to the prior art would be to dissolve salt in the sugar-containing flavoring solution with which the food is first cooked and flavored. By reason of the present invention there results a profound influence on the stability of the resultant product. The product as made according to the prior art processes will become rancid within a few weeks, whereas a similar product made by the process of our invention will remain in good condition at normal temperatures for many months.

While in the illustrative examples the grain mentioned is wheat, it is to be understood that the invention is not limited to wheat but is applicable to other grains and particularly grains high in fat content, although it is advantageously used in converting any of the usual grains into ready-to-eat cereal foods.

It is further to be understood that the raw material to be converted into flakes or other forms of ready-to-eat foods is not restricted to the cereal grains but may also include legumes or other plant materials, such as lentils, soya beans, and other edible plant seeds, which by virtue of their fat content would not have satisfactory keeping quality when processed by the methods common in the art. The invention thus renders usable as ready-to-eat types of food, various forms of plant or vegetable life which heretofore have been unsuitable for such purpose.

It is to be understood that the examples set forth above, in which individual grains are rolled and toasted, are merely illustrative, and that the invention contemplates not merely the processing of grain, such as whole kernels of wheat, corn, oats and the like, as individual grains or kernels, but is applicable as well to the treatment of homogeneous masses of cooked grains. Thus the grains or kernels of wheat, corn, oats, and the like, may be cooked and ground or otherwise formed into a homogeneous mass, and the mass formed by rolling, extruding or shredding, or in any other suitable manner, into particles, shreds, flakes, or pieces of any other suitable shape, before being toasted; or the cooked grains may be shredded in the usual manner of making shredded products, the essential feature of the invention being that the salt, or like-acting flavoring be applied, as by being sprayed in solution form, or in any other suitable manner, to the pieces, shreds, flakes or particles, however formed or shaped, after the final oven treatment or toasting.

While we are unable to explain definitely the reason for the action of the salt in one case or the other, it clearly appears that when the salt is used according to the prior practice it causes more rapid decomposition of the fat content when the food is heated to a high temperature, as in the cooking and toasting operations, whereas if the salt is omitted until after the toasting step, the food withstands the action of heat in the cooking and toasting operations so as to avoid the development of rancid odors in the product during storage in the package.

Furthermore, the customary method of applying salt in dilute water solution, according to the prior practices, permits the salt to permeate the food thoroughly and to contact intimately with the fats, oils and other unstable constituents of the material, thus facilitating by close association the action of salt and its decomposition products and like-acting substances upon the unstable constituents. In the process of our invention the salt is preferably applied in a practically saturated aqueous solution, and the grains are immediately thereafter subjected to a drying operation which tends to fix the salt in dry form upon the exterior surface of the grains so that it is not free to react chemically with other constituents of the food. It is well-known that chemical reactions between solids are generally facilitated by the presence of water, so that the present process further prevents undesirable chemical reactions by limiting the quantity of water to that actually required to apply the salt to the surface of the food.

Penetration of food materials is less in the case of saturated than in that of dilute aqueous solutions, so that chemical reactions are further avoided by utilizing preferably a saturated aqueous solution of salt.

While salt is the seasoning most commonly or in fact almost universally used as one of the flavoring ingredients in the manufacture of ready-to-eat cereal foods, we do not limit ourselves thereto, but contemplate not only salt but other similarly-acting substances or ingredients.

We claim:

1. A process of making a prepared food product from plant material having substantial fat content, comprising cooking the material in moisture in the absence of extraneous salt which would act on the fatty elements of the material under the action of high heat, subjecting the material to dry heat at an elevated temperature, and subsequently applying said salt externally to the material.

2. A process of making a prepared food product from plant material having substantial fat content, comprising cooking the material in moisture but without flavoring salt which would act on the fatty elements of the material under the action of high heat, subjecting the material to dry heat at a toasting temperature, and thereafter applying said salt externally to the material.

3. A process of making prepared cereal foods, comprising cooking the cereal in moisture in the absence of extraneous salt, thereafter submitting the same to elevated dry heat treatment, and then applying a solution of salt to the cereal.

4. A process of making prepared cereal foods, comprising cooking the cereal in moisture in the absence of extraneous salt, thereafter toasting the same, and then applying a solution of salt to the toasted cereal.

5. A process of making a ready-to-eat cereal food, comprising cooking cereal grains having a high fat content, as whole corn, wheat and the like in moisture containing a flavoring agent, as sugar, but devoid of sodium chloride, partially drying the cooked grains, rolling the cooked grains, toasting and puffing the rolled grains by dry heat, supplying the toasted and puffed grains with an aqueous solution of sodium chloride, and then drying the grains.

6. A process of making a ready-to-eat cereal food, comprising cooking cereal grains having a high fat content, as whole corn, wheat and the like in moisture but in the absence of sodium chloride, partially drying the cooked grains, rolling the grains while moist and hot and then partially drying the same, toasting the partially dried grains, supplying the toasted individual grains with an aqueous solution of sodium chloride, and then drying the grains.

7. A process of making a ready-to-eat cereal food, comprising cooking cereal grains having a high fat content, as whole corn, wheat and the like in moisture but in the absence of sodium chloride, rolling the cooked grains, and toasting the rolled grains, including the step of adding a sweetening agent to the grains prior to the toasting step, supplying the toasted grains externally with an aqueous solution of salt, and then drying the grains.

8. A process of making cereal foods, comprising cooking in moisture but in the absence of extraneous salt, cereal grains having a high fat content, as whole corn, wheat and the like, flattening the cooked grains, toasting the same, and subjecting the toasted grains to a spray of a solution of sodium chloride on the exterior surface of the grains.

9. A process for making ready-to-eat cereal food, comprising cooking in moisture but in the absence of extraneous salt, cereal grains having a high fat content, as whole corn, wheat and the like, rolling the rooked grains, and toasting the rolled grains, including the step at a stage prior to the toasting step of flavoring the grains with a sweetening substance, subjecting the toasted grains to a fine spray of a practically saturated aqueous solution of salt, and then drying the grains to fix the salt on the exterior of the grains.

10. A process for making ready-to-eat cereal food, comprising cooking in moisture but in the absence of extraneous salt, cereal grains having a high fat content, as whole corn, wheat and the like, flattening the cooked grains individually, and toasting the same, including the step at a stage prior to the toasting step of flavoring the grains with a sweetening substance, subjecting the toasted grains to a spray of an aqueous solution of salt, and then immediately evaporating the solvent to fix the salt on the exterior of the grains.

11. A process for making ready-to-eat cereal foods, comprising cooking in moisture and with a sweetening agent but in the absence of extraneous salt, cereal grains having a high fat content, as whole corn, wheat and the like, flattening the cooked grains individually while moist and hot, and toasting the same, subjecting the toasted grains to a fine spray of a practically saturated aqueous solution of salt, and then immediately removing the solvent to fix the salt on the exterior surface of the grains.

12. A process of making a prepared food product, comprising cooking plant material having a substantial fat content and in the form of particles, as kernels, grain and seeds, in moisture but in the absence of flavoring salt which would act on the fatty element of the material under the action of high heat, subjecting the cooked particles to dry heat at a toasting temperature and then applying said salt externally to the particles.

13. A process of making a ready to eat cereal food, comprising cooking cereal grains in moisture in the absence of flavoring salt which would act on the fatty content of the material, rolling the cooked grains, submitting the rolled grains to elevated dry heat, and thereafter applying such salt to the grains.

14. A process of treating cereal grains, comprising cooking such grains in moisture in the absence of flavoring salt which would act on the fatty content of the material, rolling the cooked grains, toasting the rolled grains and thereafter applying an aqueous solution of such salt to the grains.

15. A process of making a ready to eat cereal food, comprising cooking cereal grains in moisture with or without a sweetening agent but in the absence of extraneous salt which would act on the fatty content of the grain, rolling the cooked grains, toasting the rolled grains, supplying the toasted grains externally with an aqueous solution of such salt, and then evaporating the solvent.

16. A process of making a ready to eat cereal food, comprising cooking cereal grains in moisture in the absence of flavoring salt which would act on the fatty content of the material, rolling the cooked grains, toasting the rolled grains, including the step of adding a sweetening solution of the grain at a stage prior to the toasting step, and after the toasting step adding externally to the grains an aqueous solution of such salt.

HAROLD K. WILDER.
CARL W. LINDOW.